W. BECK.
Mold for the Manufacture of Tubular or Hollow Articles of Glassware.
No. 196,326. Patented Oct. 23, 1877.
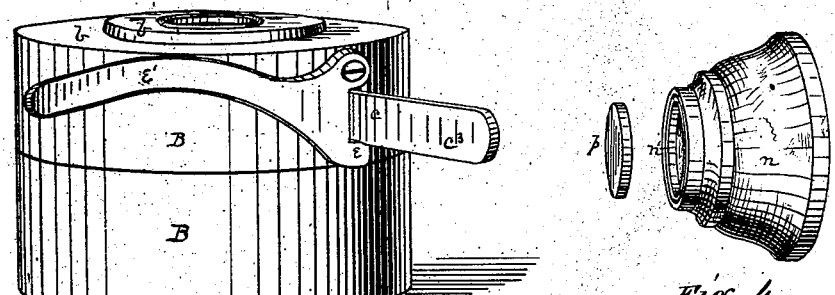
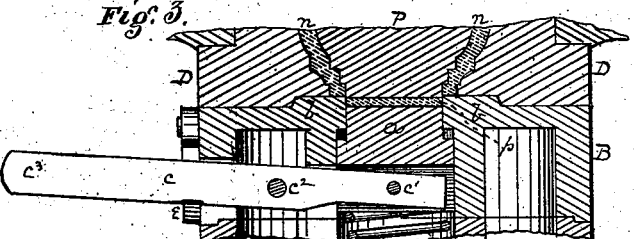
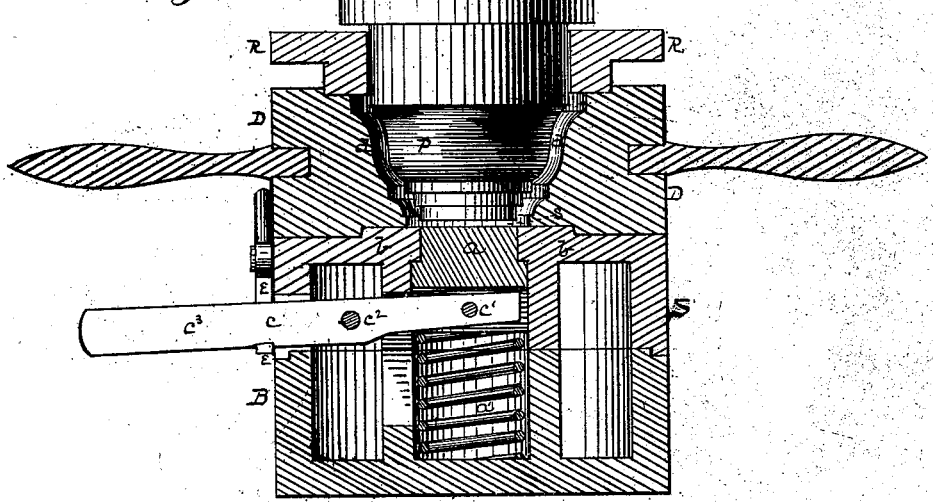

UNITED STATES PATENT OFFICE.

WASHINGTON BECK, OF PITTSBURG, PENNSYLVANIA.

IMPROVEMENT IN MOLDS FOR THE MANUFACTURE OF TUBULAR OR HOLLOW ARTICLES OF GLASSWARE.

Specification forming part of Letters Patent No. 196,326, dated October 23, 1877; application filed April 9, 1877.

*To all whom it may concern:*

Be it known that I, WASHINGTON BECK, of Pittsburg, county of Allegheny, State of Pennsylvania, have invented or discovered a new and useful Improvement in the Manufacture of Glassware; and I do hereby declare the following to be a full, clear, concise, and exact description thereof, reference being had to the accompanying drawing, making a part of this specification, in which—like letters indicating like parts—

Figure 1 is a sectional view of a mold and plunger (in elevation) illustrative of my invention. Fig. 2, by a like view of a detached portion, further illustrates the operation involved. Fig. 3 is a side view of the mold-base, showing the lock, presently to be described; and Fig. 4 shows the product and results.

My invention relates to a mode of making holes in glass, by passing a plunger or mandrel through the molten glass, so as to cut out of the glass a section or portion corresponding to the size and shape of the hole desired, such plunger or mandrel working against a die, so that one may pass outside or inside the other, or both move together past a cutting-edge, so as, in either case, to carry the part or section cut out clear of the cavity in which the glass immediately around the hole is pressed or inclosed. And while many devices may be devised suitable for carrying out this operation, I have shown and will describe the construction and operation of a mold and plunger which I now believe to be the best for the purpose, in the manufacture of glassware open at the top, where the plunger is introduced, and having an opening below such as may be desired.

The base or bottom part B of the mold is made hollow. Its top plate $b$ is of the usual form, suitable for the centering thereon of a two-part or solid mold, D, such as may be desired, so as to give a cavity, $d$, between its walls and the face of the plunger P. The lower end of the plunger is made of the shape of the hole to be made, or of the piece, $p$, to be cut out, and a hole of corresponding size, and in line therewith, is made in the plate $b$, and this hole is filled with a movable die, $a$, so arranged that when up, as in Fig. 1, its upper face will be about even with the adjacent walls of the cavity $d$, but so that it may by pressure be forced down, as in Fig. 2, a distance equal to the thickness of the piece, $p$, to be cut out. It is supported or forced up by a spring, $a'$, of any convenient construction, or by a counter-weight, or by the hand of the workman, or by other known means. With the addition of the usual ring-plate R, the mold is ready for use.

Until the devices come to the position shown in Fig. 1, the operation is such as is well known in the art of pressing glassware. As the pressure is continued, the power, acting from the plunger through the layer of glass inclosed in the space $s$, between the lower end of the plunger P and the upper end of the movable die $a$, causes the latter to be depressed below the level of its surrounding adjacent walls, the spring $a'$ yielding for the purpose. This motion is continued until the devices come into the position shown in Fig. 2, with the lower end of the plunger down to or below the walls of the cavity $d$, immediately around the hole in which the die $a$ moves, by which means the piece of glass $p$ is cut out, and a hole, $n'$, of corresponding size and shape, is made through the bottom of the glass article $n$, as shown in Fig. 4; and the size and form of the piece cut out, and the size and form or shape of the hole, may be varied at pleasure by properly shaping the lower end of the plunger, the hole in the plate $b$, and the die $a$. The article $n$ receives its shape, and is made in other respects, in the manner well known in the art; and this mode of making holes in glass or glassware may be applied to articles of all kinds and shapes by making the cavity $d$ and the other parts to correspond, and among others I may enumerate clock-frames, decanters, pump-cylinders, gas-burners, shades and globes, business-cards, medallions, oilers, buttons, &c.

By this mode of operation I am enabled to make, by the operation of pressing, many articles which heretofore, on account of the comparative thinness of the product, could be made successfully only by blowing, or by hand, or by the two combined.

I have also found it important in many cases to prevent the piece $p$ from being brought back to the place from which it was cut when the plunger is withdrawn. This may be accomplished in various ways; but, preferably, I use a self-locking lever, $c$, which is pivoted at $c^1$ to the movable die $a$, fulcrumed at $c^2$, and projects with its handle or free end $c^3$ outside the box B. This handle may be weighted, if so preferred, so as to obviate the necessity of using the spring $a'$. On the outside of the box B, and in suitable position, I pivot a swinging hook, $e$, preferably weighted by a handle, $e'$, so that when the die $a$ is up and the handle $c^3$ is down, the hook $e$ will not engage the handle; but when the die $a$ is depressed, as above described, the handle $c^3$, being thereby raised, will be engaged by the hook $e$ and held up. The result will be that the plunger can be withdrawn, and the pressed glass article $n$ can be removed without danger of the cut-out piece $p$ adhering to it, after which the hook $e$ is knocked loose, and the die $a$, coming up, throws out the piece $p$, and the devices are then again ready for use.

I have described this as a mode of making holes in glass. It may also be employed for cutting out sections of glass for various purposes, the piece cut out then being the useful product.

Substantially the same mode of cutting out glass sections, or making holes in glass, is involved in a plunger passing outside a pair of movable dies, which shall inclose the layer of glass to be cut out; but the construction of such an apparatus will constitute the subject-matter of one or more separate applications.

I am aware that glass has been blown or pressed around stationary mandrels in making holes; also, that moving mandrels have been projected into the body of glass, so as to displace the glass laterally, and leave forward of the end of the mandrel only a thin film of glass, which was easily broken away to complete the hole; but I am not aware of any prior perforating, punching, or cutting out of the body of molten glass by a moving plunger operating in combination with a movable die or mandrel.

I claim herein as my invention—

1. The mode of perforating glass by cutting out a part or section of the molten glass while inclosed between two moving surfaces, and carrying it out of contact with the glass from which it is cut or severed, substantially as set forth.

2. In combination with the movable bottom of a glass-mold yielding to excessive plunger-pressure, a plunger having a range of motion through the space occupied previous to pressing by the molten glass, substantially as set forth.

3. A movable bottom of a glass-mold, held up as against the plunger-pressure by a spring or equivalent weight, arranged to be depressed on a continuation or increase of the plunger-pressure, in combination with a lock to hold it in a depressed position till the article pressed is solidified or removed, such movable bottom and plunger having a range of motion beyond or outside of the pressing-cavity, substantially as set forth.

4. The mode of making glass articles by cutting them out of a body of molten or plastic glass between a moving die and plunger working through the walls inclosing the movable die, substantially as set forth.

In testimony whereof I have hereunto set my hand.

WASHINGTON BECK.

Witnesses:
J. J. McCORMICK,
CLAUDIUS L. PARKER.